United States Patent [19]

Salzburg et al.

[11] Patent Number: 4,529,666

[45] Date of Patent: Jul. 16, 1985

[54] PLASTICIZED POLYVINYL ALCOHOL

[75] Inventors: Herbert Salzburg, Cologne; Klaus Reinking, Wermelskirchen; Frank Kleiner, Leverkusen, all of Fed. Rep. of Germany

[73] Assignee: Bayer Aktiengesellschaft, Leverkusen, Fed. Rep. of Germany

[21] Appl. No.: 680,155

[22] Filed: Dec. 10, 1984

[30] Foreign Application Priority Data

Dec. 24, 1983 [DE] Fed. Rep. of Germany ....... 3347075

[51] Int. Cl.³ .................. C08L 29/04; C08K 5/15; C08F 8/12; C08J 3/18
[52] U.S. Cl. ................. 428/475.8; 428/500; 524/56; 524/58; 524/109; 524/111; 524/503; 525/58
[58] Field of Search .............. 525/58; 524/56, 58, 524/109, 111, 503; 428/475.8, 500

[56] References Cited

U.S. PATENT DOCUMENTS

| 2,967,169 | 1/1961 | Oberdorfer | 524/109 |
| 3,179,607 | 4/1965 | Suda et al. | 524/58 |
| 3,746,565 | 7/1973 | Schneider et al. | 428/475.8 |
| 3,980,605 | 9/1976 | Steigelmann et al. | 524/503 |
| 4,383,051 | 5/1983 | Meyborg et al. | 521/176 |
| 4,468,427 | 8/1984 | Degrassi et al. | 428/475.8 |
| 4,476,253 | 10/1984 | Salzburg et al. | 521/176 |

FOREIGN PATENT DOCUMENTS 0026875  3/1978  Japan ................ 428/475.8

*Primary Examiner*—Herbert J. Lilling
*Attorney, Agent, or Firm*—Connolly and Hutz

[57] ABSTRACT

Plasticized polyvinyl alcohol containing one or more 1,4-monoanhydrohexitols and/or one or more 1,4-3,6-dianhydrohexitols and its use for the production of composite films by coestrusion, coating, doubling and lamination.

4 Claims, No Drawings

PLASTICIZED POLYVINYL ALCOHOL

Polyvinyl alcohol in its dry state is substantially impermeable to gases, for example nitrogen, oxygen and carbon dioxide, and to volatile aroma carriers and, accordingly, it may be used for the production of gas- and aroma-tight films and containers.

Polyvinyl alcohol is only impermeable to gases in its dry state, but is hygroscopic and soluble in water. Accordingly, gas tight containers containing polyvinyl alcohol as the barrier layer have to be composites in which the polyvinyl alcohol layer is protected on both sides by hydrophobic layers, for example polyolefins or polyvinylidene chloride, to prevent the penetration of atmospheric moisture.

Composite films can be produced inter alia by lacquering or by doubling or laminating a prefabricated film. However, since these processes always involve one or more additional process steps, the technique of coextrusion is frequently preferred for the production of composite films.

However, the production of composite films by coextrusion is possible only if all the components involved have thermoplastic properties.

In its pure form, polyvinyl alcohol cannot be processed as a thermoplast because it decomposes below its softening point. In addition, films of pure polyvinyl alcohol are brittle and cannot be deep-drawn. Accordingly, attempts have been made to improve the processibility of polyvinyl alcohol through the incorporation of plasticizers which also eliminates its brittleness.

The most widely used plasticizers are liquid polyols, such as ethylene glycol or glycerol. Polyvinyl alcohol modified by these materials can be processed as a thermoplast, for example by extrusion. However, it has been found that, on account of their volatility, the plasticizers partially evaporate or, like glycerol (the most widely used), thermally decompose during the extrusion process. Because of its pungent odour, the acrolein formed in this decomposition is quite bothersome.

These disadvantages can be avoided by reducing the extrusion temperature from about 200°–220° C. to around 120° C. by adding small quantities of water. At that temperature, however, polyvinyl alcohol containing composite films cannot be produced by coextrusion.

Examples of solid polyols which do not have the above-mentioned disadvantage of being volatile during the thermoplastic processing which is associated with liquid polyols include sorbitol or pentaerythritol. However, it has been found that, in contrast to films of polyvinyl alcohol modified with liquid polyols, extruded films of polyvinyl alcohol modified with solid polyols are extremely brittle and cannot be deep-drawn and they are not really impermeable to gases and aroma carriers because they are extremely inhomogeneous and, accordingly, contain numerous faults.

The desired property of impermeability to gases and aroma carriers cannot be acquired by using partially hydrolyzed polyvinyl acetate because, such copolymers of polyvinyl acetate and polyvinyl alcohol can certainly be extruded, but they show only limited permeability to gases and aroma carriers.

Another conceivable method of making polyvinyl alcohol extrudable is to incorporate comonomers into the polyvinyl alcohol molecules, for example by copolymerizing vinyl acetate with ethylene and hydrolyzing the polyvinyl acetate formed. The permeability to gases of such ethylene-vinyl alcohol copolymers depends in particular upon their ethylene contents. The ethylene-vinyl alcohol copolymers which some close to polyvinyl alcohol in their impermeability to gases contain $\leq 20\%$ of ethylene.

Products of this kind are already commercially available. However, films of these materials do not really lend themselves to deep drawings. For this reason, ethylene-vinyl alcohol copolymers containing approximately 30% of ethylene are predominantly used in the production of single-layer films and composite films for packaging purposes. However, the impermeability of these ethylene vinyl alcohol copolymers to gases is considerably poorer than that of polyvinyl alcohol.

The present invention is based on the observation that 1,4-monoanhydrohexitols and 1,4-3,6-dianhydrohexitols are excellent plasticizers for polyvinyl alcohol. The disadvantages of previously known plasticizer systems (volatility, thermochemical degradation, unsatisfactory thermoplastic processibility, lack of coextrudability and also brittleness, inhomogeneity and inadequeate deep-drawability of the films) are avoided without any deterioration in the required impermeability to gases and aroma carriers. This is particularly surprising because the hexitols, for example sorbitol, of which the mono- or dianhydrohexitols are derived show the disadvantages mentioned previously in a very pronounced fashion when used as polyvinyl alcohol plasticizers.

Though they are solids, the plasticizers according to the invention do not create any of the known disadvantages mentioned above associated with solid plasticizers.

Accordingly, the present invention provides a plasticized polyvinyl alcohol containing from 1 to 35% by weight and preferably from 4 to 27% by weight, based on the total mixture, of one or more 1,4-monoanhydrohexitols and/or one or more 1,4-3,6-dianhydrohexitols.

The present invention also relates to the use of plasticized polyvinyl alcohol for the production of composite films by coextrusion.

Polyvinyl alcohols suitable for the purposes of the invention are preferably those having viscosities of from 4 to 66 mPa.s (as measured on 4% aqueous solutions at 20° C. in accordance with DIN 53 015). They are generally obtained by the polymerization of vinyl acetate, followed by hydrolysis. The degree of hydrolysis is at least 95% and preferably at least 98%.

1,4-Monoanhydrohexitols are compounds corresponding to formula (I) whilst 1,4-3,6-dianhydrohexitols are compounds corresponding to formula (II).

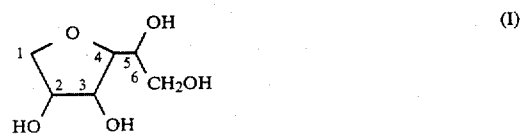

(I)

(II)

Both types of compounds are known and may be obtained by removing one or two moles of water from hexitols corresponding to the following formula:

CH$_2$OH(CHOH)$_4$—CH$_2$OH using methods known from the literature. The monoanhydro- and dianhydro derivatives or sorbitol, mannitol and iditol are particularly suitable. All these derivatives correspond to formula (I) or to formula (II) and differ solely in the steric arrangement of their OH groups. According to the invention, monoanhydrohexitols or dianhydrohexitols may be individually used. However, it is preferred to use a mixture, for example a mixture of several stereoisomeric 1,4-monoanhydrohexitols, although monoanhydrohexitols and dianhydrohexitols may also be used in admixture. Whereas the pure compounds are generally solid, most mixtures are liquids and, accordingly, easier to dose.

The anhydrohexitols may be added to the polyvinyl alcohol by methods known per se. The polyvinyl alcohols are preferably dissolved in a suitable solvent, for example an alcohol or, preferably, water, followed by addition of the hexitol(s). In order to remove the water from these solutions, it is possible, for example, to use an evaporation screw which directly discharges the plasticized polyvinyl alcohol in granulate form.

Surprisingly, the polyvinyl alcohol plasticized in accordance with the invention give clear, transparent films having a considerably better sealing effect, for example against oxygen or carbon dioxide, than comparable ethylene-vinyl alcohol copolymers. In order to achieve substantially the same sealing effect, the film of the material according to the invention need have only about half the thickness.

The films of this invention are suitable for making composite films with e.g. films of thermoplastic polymers such as polyethylene, polypropylene, polyamide 6, polyamide 6,6, polycarbonate, polyethyleneterephthalate, polybutylenterephthalate, polyvinylchloride, polyvinylidenchloride. For making these composites in conventional methods such as coextrusion, coating, laminating and doubling can be employed.

Films of material according to the invention are compatible with polyamide films so that corresponding composite films are easily produced. The films remain deep-drawable in combination with polyamide films. Especially suitable are polyamide films of polyamide 6, polyamide 66 or copolyamides from caprolactame, hexamethylenediamine and adipic acid. This makes the material according to the invention particularly suitable for the production of containers impermeable to oxygen and carbon dioxide.

The following Examples illustrate the invention without limiting it in any way.

EXAMPLES

Production of the plasticized polyvinyl alcohol

The following mixtures were dissolved while heating (up to 100° C.) in 9 kg of water.

The mixtures are capable of concentration by evaporation at 170°–200° C./28 mm Hg in a twin-screw evaporator to form a free-flowing granulate:

| PVAL* (g) | Viscosity[1] MPa · s | Degree of hydrolysis (mole %) | Additive | Quantity (g) |
|---|---|---|---|---|
| 750 | 20 | 98 | DAS[2] | 250 |
| 700 | 28 | 99 | DAS | 300 |
| 800 | 20 | 98 | DAS | 200 |
| 820 | 28 | 99 | DAS/MAS[3] | 90/90 |
| 840 | 28 | 99 | DAS/DAM[4] | 140/30 |
| 820 | 28 | 99 | DAS/DAM/DAI[5] | 120/30/20 |
| 920 | 28 | 99 | MAS/DAM | 40/40 |
| 960 | 28 | 99 | DAS | 40 |

[1]as measured on a 4% aqueous solution at 20° C. in accordance with DIN 53015
[2]DAS = 1,4-3,6-dianhydrosorbitol
[3]MAS = 1,4-monoanhydrosorbitol
[4]DAM = 1,4-3,6-dianhydromannitol
[5]DAI = 1,4-3,6-dianhydroiditol
*PVAL = polyvinyl alcohol
These mixtures may be processed into films.

EXAMPLE 1

Extruded single-layer films of polyvinyl alcohol

Using a 400 mm wide flat sheet die, 300 mm wide and approximately 50 μm thick single-layer films are extruded under the following conditions from the above-mentioned mixtures of polyvinyl alcohol and mono- and/or dianhydrohexitols after preliminary drying in vacuo at 100° C., extrusion being carried out by the chill-roll technique:

| | |
|---|---|
| Extruder: | Reiffenhauser S 30 single-screw extruder, three-zone screw with a compression ratio of 1:2.5 |
| Barrel temperatures: | 190–210° C. |
| Die temperature: | 230° C. |
| Roll temperature: | 90° C. |
| Screw speed: | 50 r.p.m. |

The single-layer films thus produced are flexible, tough, deep-drawable, colorless and transparent. In the dry state, their permeation coefficients for oxygen amount to $0.00002 \cdot 10^{-9} \frac{cm^3(NTP) \cdot cm}{cm^2 \cdot sec \cdot cm_{Hg}}$ and, for carbon dioxide, to $0.00006 \cdot 10^{-9} \frac{cm^3(NTP) \cdot cm}{cm^2 \cdot sec \cdot cm_{Hg}}$ For comparison: the permeation coefficients of a single-layer film of a copolymer of ethylene and vinyl alcohol containing 20% of ethylene (GL resin, type GL-D of Nippon Gohsei), again in the dry state, amount to $0.000035 \cdot 10^{-9} \frac{cm^3(NTP) \cdot cm}{cm^2 \cdot sec \cdot cm_{Hg}}$ for oxygen and to $0.000065 \cdot 10^{-9} \frac{cm^3(NTP) \cdot cm}{cm^2 \cdot sec \cdot cm_{Hg}}$ for carbon dioxide.

EXAMPLE 2

Coextruded composite films of polyvinyl alcohol and polyamide

Using a 900 mm wide flat sheeting coextrusion die, 800 mm wide composite films consisting of approximately 25 μm thick layers of polyvinyl alcohol and polyamide are produced by the chill-roll technique under the following conditions from the above-mentioned mixtures of polyvinyl alcohol and mono- and/or dianhydrohexitols and from a mixture of 85% of polyamide-6 and 15% of polyamide-66:

| | |
|---|---|
| Extruder: | Reiffenhauser S 45 single-screw extruder, three-zone screw with a compression ratio of 1:2.5 |
| Barrel temperatures: | |
| PVAL*-extruder: | 210–230° C. |
| PA**-extruder: | 230° C. |
| Screw speed: | |
| PVAL-extruder: | 60 r.p.m. |
| PA-extruder: | 53 r.p.m. |
| Die temperature: | 230° C. |
| Roll temperature: | 110° C. |

*PVAL = polyvinyl alcohol
**PA = polyamide

The PVAL/PA composite films thus obtained are flexible, tough, deep-drawable, colorless and transparent. The PVAL- and PA-layers adhere firmly to one another.

We claim:

1. Plasticized polyvinyl alcohol, which contains from 1 to 35% by weight, based on the total mixture, of one or more 1,4-monoanhydrohexitols and/or one or more 1,4-3,6-dianhydrohexitols.

2. Gas impermeable film made from the plasticized polyvinyl alcohol of claim 1.

3. Gas impermeable film made from a layer of plasticized polyvinyl alcohol of claim 1 and at least one layer of a thermoplastic polymer.

4. Gas impermeable film made from a layer of plasticized polyvinyl alcohol of claim 1 and at least one layer of polyamide.

* * * * *